J. KACHELMAN, Jr.

Perpetual Time and Interest Calculator.

No. 8,334. Reissued July 16, 1878.

*Witnesses:*

J. F. Th. Lang

J. Rufell Bart

*Inventor:*

John Kachelman Jr.

by

Munn, Prentice & Lawrence

3 Sheets—Sheet 2

J. KACHELMAN, Jr.

Perpetual Time and Interest Calculator.

Figure 3:
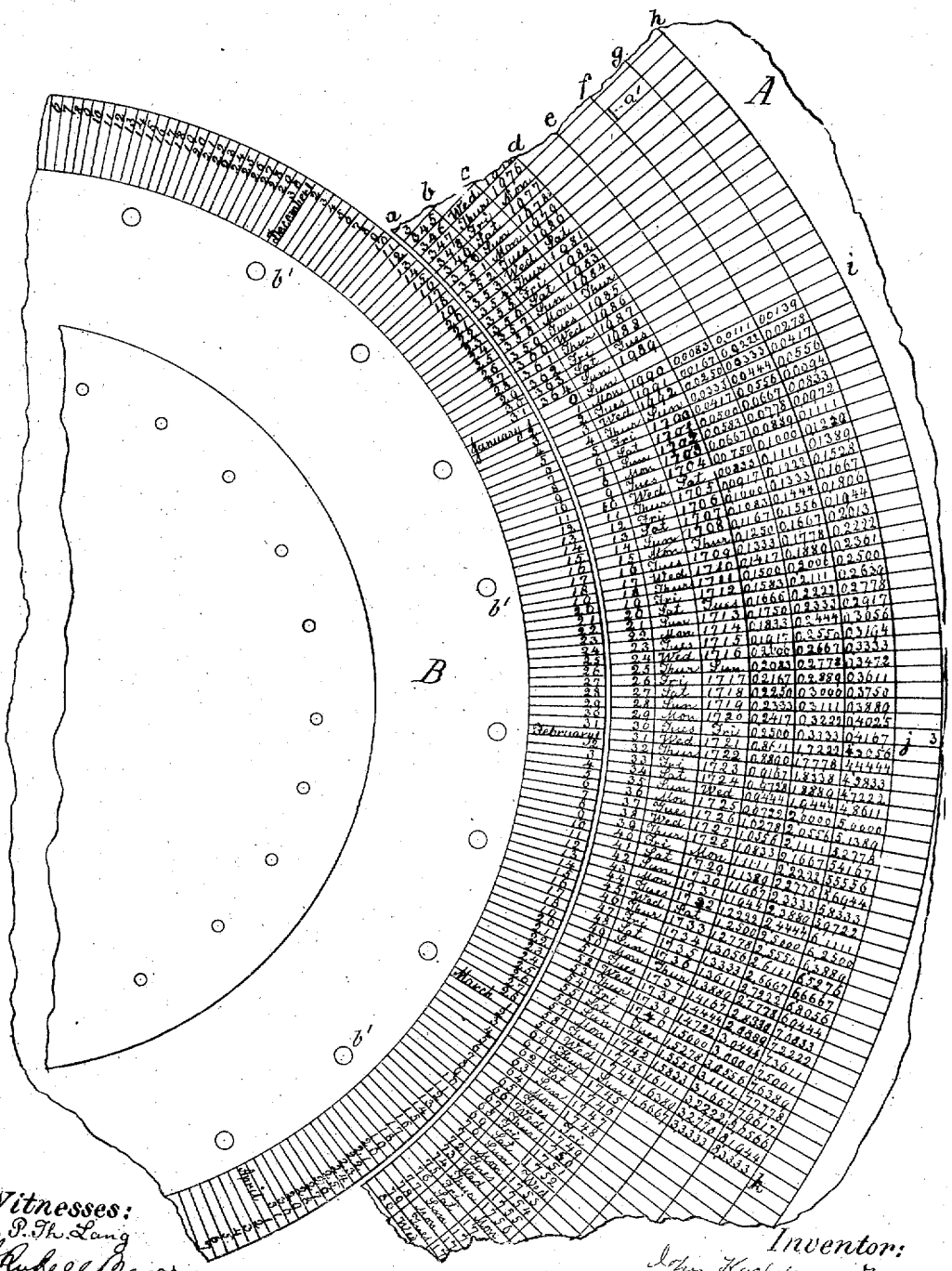

No. 8,334. *Fig 3.* Reissued July 16, 1878.

*Witnesses:*
J. P. Th. Lang
J. Russell Barr

*Inventor:*
John Kachelman Jr
by
Munn, Dennett & Sawyer

J. KACHELMAN, Jr.

Perpetual Time and Interest Calculator.

No. 8,334. Reissued July 16, 1878.

Witnesses.
J. P. Th. Lang
Rufell Barr

Inventor:
John Kachelman Jr
by
Mason, Fenwick & Lawrence
atty

UNITED STATES PATENT OFFICE.

JOHN KACHELMAN, JR., OF EVANSVILLE, INDIANA.

IMPROVEMENT IN PERPETUAL TIME AND INTEREST CALCULATORS.

Specification forming part of Letters Patent No. 201,617, dated March 26, 1878; Reissue No. 8,331, dated July 16, 1878; application filed June 25, 1878.

*To all whom it may concern:*

Be it known that I, JOHN KACHELMAN, Jr., of Evansville, in the county of Vanderburg and State of Indiana, have invented a new and useful Improvement in Perpetual Time and Interest Calendars, which improvement is fully set forth in the following specification and accompanying drawing, in which latter—

Figure 1:
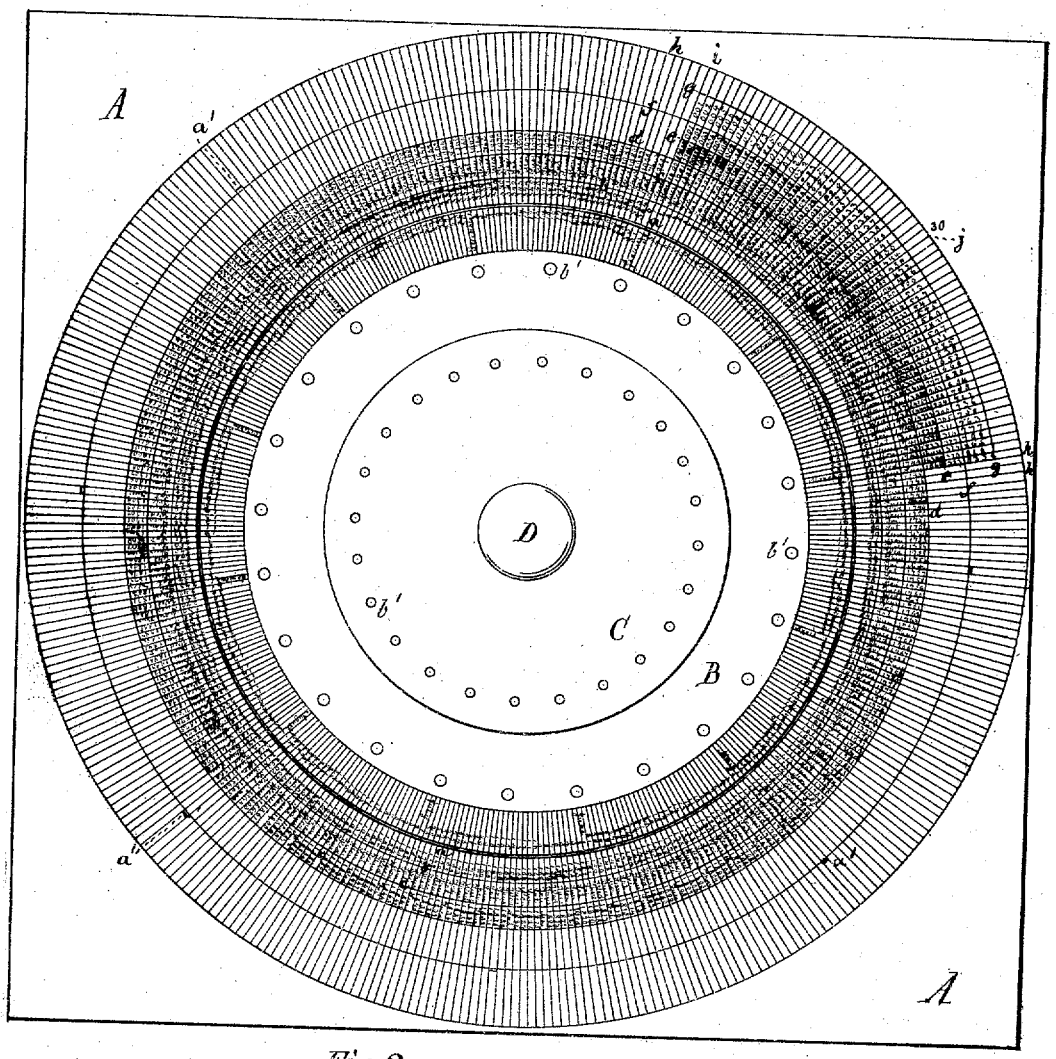
Figure 2:
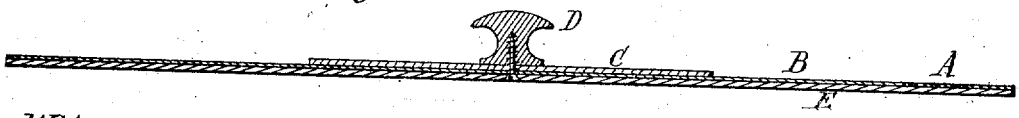
Figure 4:
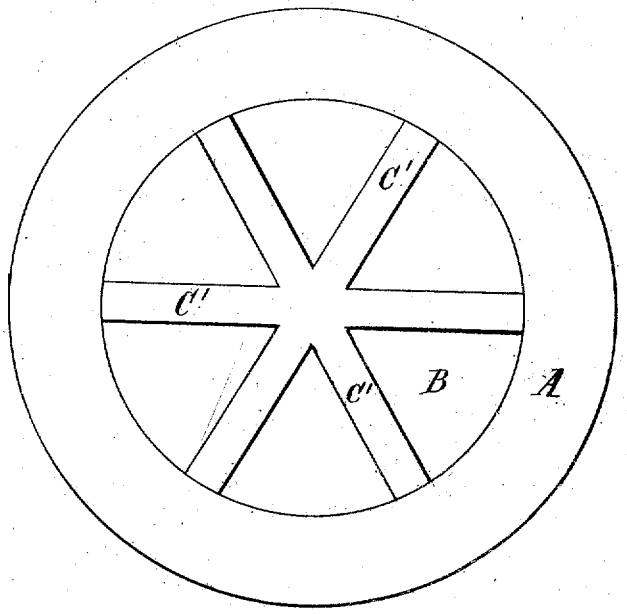
Figure 5:
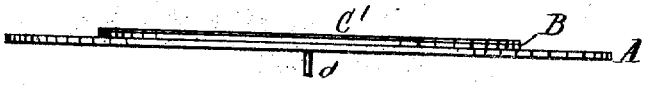
Figure 6:
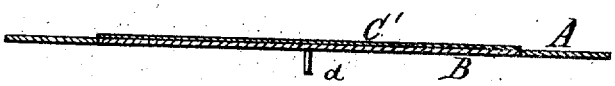

Figure 1 is a plan view of my improved calendar. Fig. 2 is a transverse section of the same. Fig. 3 is a detail view of the same. Fig. 4 is a modification of the same. Fig. 5 is an edge view of the above modification. Fig. 6 is another modification, shown in transverse section.

The nature of my invention consists in one stationary and one revolving circular table, the one having the number of days in a common year, the names of the days of the week, the numbers of the years, beginning with 1700 and ending with 1992, or any other suitable series of numbers of that class, with the name of the week-day coming on the 1st of March of each leap-year, and computations of the most popular rates of interest arranged in circular concentric columns; and the other table containing the dates of the twelve months of a common year, whereby days of the week, monthly dates, and daily and monthly interest may be instantly found and applied to calculations in business.

My invention also consists in the construction of the two concentric tables of light material, such as paper, tin, or a suitable combination of such material, having the above-mentioned characters, names, computations, and so on engraved, stamped, printed, or painted upon their surfaces, and fastened together and to a backing of pasteboard or other suitable material, whereby a light and cheap portable article is produced.

In the drawings, A represents a piece of paper, tin, or other thin and light material, which is provided with a number of concentric circles, *a b c d e f g h*. The said concentric circles are equally divided by 365 radii. Between the circles *a b* the numbers 0 1 2 3 up to 364 are inscribed, 0 being the beginning number, for the reason that the first day does not bear interest and cannot be counted in computing interest, as will be hereinafter explained. Between the circles *b c* the names of the days of the week are inscribed in regular succession. Between the circles *c* and *d* the number of the years between 1700 and 1992 are inscribed in regular order, having the name of the 1st day of March inserted after each leap-year. The arrangement of the columns between the circles *b c* and *c d* is also such that opposite each year the name of the weekly day upon which the 1st of January falls is placed.

Between the circles *d e f g h* the computations of interest are inscribed in the following manner: From radius *i* in Fig. 3 to radius *j* there are the amounts of interest of thirty consecutive days at three per cent., four per cent., and five per cent. per annum on a capital of $100. Between the radii *j* and *k* there is a similar arrangement of interest from thirty-one to sixty days for capital sums of $100, $200, and $300 at ten per cent. per annum.

The above-mentioned computations of interest are to extend over the entire year, this being sufficient to explain its working. Additional spaces may be added, which may be filled with computations of a similar character.

Within the circle *a* a revolving table, B, is secured, which has around its margin the twelve months of the common year and the dates thereof arranged in successive order.

The tables A B may be made of paper, tin, pasteboard, or any suitable material, and the inner table B may be stiffened by ribs C′ of stronger material, as shown in Fig. 4, or by a disk, C, as shown in Fig. 1.

The table B is provided with a center knob, D, and a center screw or pivot, *d*, whereby it may be attached to a board, E, as seen in Fig. 2. To overcome any objection to the use of the knob, a number of holes, *b′*, are provided in the inner table B, which thus may be revolved with the point of a pencil or with the hand.

The table A may be cut out around the circle *a*, so that the surface of the inner table B is flush with its own surface, as seen in Figs. 2 and 6; or it may be made of a solid sheet, and the table B placed concentrically upon it, as seen in Fig. 5.

The calender may be fastened by means of metal clasps *a'*, or may be glued or otherwise fastened to a piece of pasteboard or other suitable backing, as indicated at E, Fig. 2. The characters, names, and computations are either printed, painted, stamped, or engraved upon the surfaces of the tables A B.

Operations: When the number of days between two given dates is to be ascertained, the earlier date is found on the table B and placed opposite 0 in the first column of the table A. The number opposite the latter date denotes the days to be counted.

If a date is given, and a number of days to succeed it, the final date is found by placing the given date on the table B opposite 0 in the first column of the table A. On the table B, opposite the given number of the table A, the final date will be seen.

If the name of the weekly day of a given year is to be found, look in the column *c d* for the year, and in the column *b c*, opposite the year, will be found the weekly day on which January 1 will fall.

If the percentage, capital, and dates are given, the interest is found by placing the early date on the table B opposite 0 on table A, and opposite the final date on the corresponding interest-column of table A the amount of interest may be read off.

Examples to the above-given rules of operation:

How many days from February 12 to April 10? Place "February 12" opposite 0, and opposite "April 10" will be found "57." Answer: 57, the number of days, and during a leap-year this would be 58.

How many days from September 8 to February 15? Place "September 8" opposite 0, and opposite "February 15" will be found "160," the number of days.

A note is dated June 6, having 60 days to run; when does it become due? Place "June 6" opposite 0, and opposite "60" will then be found "August 5," showing the note to be due August 5—8.

What day of the week did February 14, 1736, fall on? First find "1736" between the circles *c d*, and opposite it, between the circles *b c*, we read "Sunday." Now place "January 1" opposite "Sunday," and we find "February 14" opposite "Tuesday," the desired name.

On what day of the week was June 12, 1736? Table A shows us that March 1 in 1736 falls on Thursday; we therefore put "March 1" of table B opposite "Thursday," and then we look opposite "June 12" and find "Tuesday," showing the day of the week on which it fell.

By placing the months and dates on the table A, and the numbers, the weekly days, and perpetual almanac, I produce the same effect without departing from the principles of my invention.

Having described my invention, what I claim as new, and desire to secure by Letters Patent, is—

1. The combination of two concentric tables, A B, the one a revolving table, B, having the twelve months, with their corresponding dates, upon its margin, and the other a stationary table, A, having arranged between concentric circles *a b c d e f g h* the number of days in a common year, beginning with 0 and ending with 364, the names of days in a whole year in consecutive order, the numbers of years from 1700 to 1992, or equivalent, with the name of each 1st day of March marked after each leap-year, and the computations of interest for capitals of various amounts, as $100 and upward, and for various interests, as 3 per cent. and upward, whereby calculations of time and interest, or determinations of weekly days for a given time, are pointed out, and can be read off from the table A by means of one movement each of the table B, substantially as set forth.

2. In the described time and interest computing calendar, the combination of the stationary columns *b c* and *c d*, whereby the names of the days for each January 1 are found in columns *b c* opposite the corresponding years in column *c d* of the perpetual calendar, substantially as set forth.

Witness my hand in the matter of my application for a patent for a perpetual time and interest calendar.

JOHN KACHELMAN, JR.

Witnesses:

JOSIAH KIGHTLY,
THOMAS RUSTIN.